United States Patent
Miyahira et al.

(10) Patent No.: US 7,529,656 B2
(45) Date of Patent: May 5, 2009

(54) TRANSLATING METHOD, TRANSLATED SENTENCE OUTPUTTING METHOD, RECORDING MEDIUM, PROGRAM, AND COMPUTER DEVICE

(75) Inventors: Tomohiro Miyahira, Yamato (JP); Yoshiroh Kamiyama, Tokyo-To (JP); Hiromi Hatori, Yokohama (JP)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 10/503,112

(22) PCT Filed: Dec. 19, 2002

(86) PCT No.: PCT/JP02/13329

§ 371 (c)(1),
(2), (4) Date: May 5, 2005

(87) PCT Pub. No.: WO03/065245

PCT Pub. Date: Aug. 7, 2003

(65) Prior Publication Data

US 2006/0167675 A1 Jul. 27, 2006

(30) Foreign Application Priority Data

Jan. 29, 2002 (JP) ............................. 2002-020676

(51) Int. Cl.
*G06F 17/28* (2006.01)
(52) U.S. Cl. .................. 704/2; 704/10; 704/3; 704/4; 704/5; 704/6; 704/7; 704/8; 704/9; 707/2; 707/3; 707/4; 707/5; 707/6; 715/257; 715/265
(58) Field of Classification Search .............. 704/1–10; 707/2–6; 715/257
See application file for complete search history.

(56) References Cited

U.S. PATENT DOCUMENTS 4,730,269 A * 3/1988 Kucera ....................... 715/533

(Continued)

FOREIGN PATENT DOCUMENTS

JP 2002-123281 4/2002

OTHER PUBLICATIONS

Turcato, et al., "Pre-Processing Closed Captions for Machine Translation", Proceedings of ANLP/NAACL 2000 Workshop: Embedded Machine Translation Systems, May 4, 2000, pp. 38-45.

(Continued)

*Primary Examiner*—Patrick N Edouard
*Assistant Examiner*—Lamont M Spooner
(74) *Attorney, Agent, or Firm*—Novak Druce + Quigg LLP

(57) ABSTRACT

A translation method for properly recognizing and automatically translating a sentence containing an emphasized word including two or more successive identical characters. First, words in a source text to be translated are looked up in a dictionary (step S201) to determine whether the text includes an unregistered word (step S203). Then, it is determined whether an unregistered word contains successive identical characters (step S205). If it contains successive identical characters, the number of the characters is reduced (step S207) and determines whether a modified word thus obtained is contained in the dictionary (step S209). If it is determined that the modified word is contained in the dictionary, the unregistered word is determined as the modified word (step S215), the part of speech and the attribute of the modified word are determined (step S217), and the unregistered word is replaced with the modified word to make translation.

1 Claim, 8 Drawing Sheets

U.S. PATENT DOCUMENTS

| | | | |
|---|---|---|---|
| 5,353,221 A | 10/1994 | Kutsumi et al. | |
| 5,579,224 A * | 11/1996 | Hirakawa et al. | 704/2 |
| 5,678,051 A | 10/1997 | Aoyama | |
| 5,873,055 A * | 2/1999 | Okunishi | 704/2 |
| 5,907,821 A * | 5/1999 | Kaji et al. | 704/4 |
| 6,385,569 B1 * | 5/2002 | Kutsumi | 704/7 |
| 6,393,389 B1 * | 5/2002 | Chanod et al. | 704/7 |
| 6,618,697 B1 * | 9/2003 | Kantrowitz et al. | 703/22 |
| 6,708,166 B1 * | 3/2004 | Dysart et al. | 707/6 |
| 6,789,057 B1 * | 9/2004 | Morimoto et al. | 704/2 |
| 6,973,423 B1 * | 12/2005 | Nunberg et al. | 704/1 |
| 6,983,238 B2 * | 1/2006 | Gao | 704/8 |
| 7,225,199 B1 * | 5/2007 | Green et al. | 707/102 |
| 7,243,305 B2 * | 7/2007 | Schabes et al. | 715/533 |
| 2003/0040900 A1 * | 2/2003 | D'Agostini | 704/2 |

OTHER PUBLICATIONS

Sproat, et al., "Normalization of Non-Standard Words", Computer Speech and Language, Elsevier, London, GB, vol. 15, No. 3, Jul. 1, 2001, pp. 287-333.

* cited by examiner

Figure 3

| Word | Part of speech | Semantic attribute | Emphatic attribute | Japanese equivalent | Attribute of Japanese equivalent |
|---|---|---|---|---|---|
| cool | Adjective | | | 冷静 | Adjective verb |
| | Adjective | | YES | クール | Adjective verb |
| | Noun | Person | | 日本人 | |
| | Noun | Language | | 日本語 | |
| Japanese | Adjective | | | 日本 | Noun + "ダ(da)" |

Figure 4

(a) It is very coool.

(b) それはとても＊クール＊です。

(A)

(a)    Oooooooops forgot it!

(b)    *しまったぁ～*それを忘れていました！

(B)

(a)    It is soooooo cold!!!!

(b)    寒いです!!!!

(C)

(a)    Pleeeaaase!! Send me email.

(b)    おねが～い!!私にEメールを送ってください。

US 7,529,656 B2

TRANSLATING METHOD, TRANSLATED SENTENCE OUTPUTTING METHOD, RECORDING MEDIUM, PROGRAM, AND COMPUTER DEVICE

CROSS-REFERENCE TO RELATED APPLICATIONS

This application forms the national phase of PCT/JP02/13329, filed Dec. 19, 2002, which claims the benefit of Japanese Application No. 2002/20676, filed Jan. 29, 2002.

BACKGROUND OF THE INVENTION

1. Technical Field

The present invention relates to a method and other measures for recognizing an emphasized word in a sentence to automatically translate the sentence.

2. Description of the Related Art

Machine translation programs have been used on information processing devices such as personal computers. These machine translation programs can automatically translate sentences displayed on monitors. They may be used for translating text in Web pages and e-mail messages on the Internet, for example.

The number of people using the Internet has increased in recent years, and along with this increase has come an increase in the amount of information transmitted by individuals. Messages written by individuals are provided as-is through, for example, Web pages set up by individual users, Web pages on which, like message boards, individual users can post messages, and online chat sites, which can be used to carry out interactive conversation between individual users. The machine translation programs are also used for translating such informal information provided by individual users.

Translation programs sometimes incorrectly translate or cannot translate information provided by individuals due to colloquial words and phrases contained in the information. Colloquial words and phrases include many words that are not contained in a dictionary referred to by a translation program. Because any words, even verbs and adjectives, that are not contained in the dictionary are treated as nouns, the translation program can fail to translate a sentence.

Examples of words that are not contained in dictionaries include those words containing a character intentionally duplicated in succession in order to emphasize them (hereinafter referred to as emphasized words) in sentences. To give a few examples in English, they include, "coool" for "cool", containing an extra "o", and "worrk" for "work," containing an extra "r". When a sentence containing such an emphasized word, such as "coool" or "worrk", is translated, the adjective "coool" or the verb "worrk" is treated as a noun, resulting in an incorrect translation.

If the emphasized form of "cool" were always represented by including three "o's", as in "coool", a correct translation could be obtained simply by adding "coool" to the dictionary. However, the number of successive duplicated characters in the word is not fixed. It may contain three, four, or five "o's", and so on. Accordingly, the number of possible emphasized words is virtually infinite. Therefore, it is practically impossible to contain all possible emphasized words in a dictionary.

As described above, colloquial words are often used in text written by individuals, especially in a chat in which conversation is made by exchanging written messages, which often cause translation failure.

Emphasized words in which identical characters are used successively are often used in informal expressions as in colloquial text. It may be appropriate to use informal, casual expressions, rather than formal ones, in the translation of such text. It is likely that the feel of such text will be better preserved in a translation by choosing an informal word as well as emphasizing the word in the translation that is equivalent to a word emphasized in the source text.

The present invention has been made to address the above-described technical problem and an object of the present invention is to provide a method and other measures capable of properly translating sentences, even if they contain unregistered words such as emphasized words.

SUMMARY OF THE INVENTION

It is one object of the present invention to provide a translation method for translating a source text in a given source language input into a computer into a text in a target language. The method includes extracting an unregistered word that is not registered in a database referenceable to the computer, and if the extracted word contains two or more successive identical characters, generating a modified word from the unregistered word by reducing the number of the successive identical characters. The method further includes translating the source text with reference to the database by replacing the unregistered word in the source text with the modified word. This translation method makes it possible to translate a source text that is otherwise untranslatable due to an unregistered word contained in the source text by using a modified word in place of the unregistered word if the unregistered word contains successive identical characters as in colloquial speech.

The number of successive duplicate characters in an unregistered word is not fixed and which character in the unregistered word is duplicated is also not fixed. Given this fact, the number of successive identical characters can be reduced in the step of generating a modified word. For example, the number of successive identical characters can be reduced to from three or more to two, or two or more to one.

Furthermore, the translation method may comprise the step of outputting a translation in a manner that makes it obvious that a target-language word equivalent to the unregistered word in the translation is translated based on the modified word.

In the translation step, a target-language word for a target-language modified word equivalent to said modified word can be extracted from said database to translate a source sentence.

It is another object of the present invention to provide a method for outputting a translation. The translation output method can be a method for outputting a translation made by a computer from the computer, comprising the steps of identifying a coined word spelled differently from standard orthography in a source text input into the computer; and outputting the translation made from the source text containing the coined word. The step of outputting the translation applies an emphasized representation to a target-language word equivalent to the coined word identified in the identifying step and outputs the translation.

In the step of outputting the translation, the target-language word can be highlighted by providing a predetermined appearance to the target-language word or altering the font of the target-language word. For example, asterisks (*) can be prepended and appended to a word "クール", which is a target-language word equivalent to "cool," to provide "*クール*", or can be presented in a different font or color.

Also, the present invention may be construed as a storage medium on which a program to be executed by a computer in a computer-readable manner. The program stored on the storage medium can cause the computer to perform morphological analysis for extracting from a database referenceable to the computer the parts of speech and attributes of words making up a source text input into the computer, and syntactic analysis for generating syntactic tree data having a tree structure for the source text based on the result of the morphological analysis. A syntax generation process can be performed for generating syntactic tree data for a target sentence based on the result of the syntactic analysis, and a translation generation process for obtaining target-language words equivalent to the words making up the source text from the database and linking the target-language words together based on the syntactic tree data for the target sentence to generate a translation. If the source text contains an unregistered word that is not registered in the database and the unregistered word contains two or more successive identical characters, the number of the successive identical characters is reduced to one or two to generate a modified word and the part of speech and the attribute of the modified word are extracted from the database in place of the unregistered word in the morphological analysis.

In the translation generation process, if the modified word replacing the unregistered word has an emphatic attribute, an emphasized target-language word associated with the emphatic attribute can be obtained as the target-language word from the database to generate the translation containing the emphasized target-language word, or data can be added to the target-language word equivalent to the modified word for indicating that the target-language word is translated from the modified word. For example, based on this data, the target-language word equivalent to the modified word can be presented so as to be distinguishable from the other parts of the translation.

Also, the present invention may be construed as a program for causing a computer to perform translation. The program can cause the computer to perform the steps of: extracting an unregistered word that is not registered in a database referenceable to the computer from a source sentence input into the computer; changing the number of repeated characters in the unregistered word and, if the changed unregistered word matches a registered word registered in the database, using the registered word in place of the unregistered word to translate the source text; and displaying a translation in a manner that the part in which the registered word is used in place of the unregistered word can be distinguished from the other parts of the translation.

For example, the step of displaying the translation in this program may comprise the step of causing the computer to perform at least one of addition of predetermined emphasizing data (for example, an asterisk (*)) to, change of the font (including the typeface, style, and color) of, and/or change of the color of the part in which the registered word is used in place of the unregistered word so that the part can be distinguished from the other parts.

In another aspect, the present invention may be construed as a computer. The computer is characterized in that a database contains data on a plurality of words; an input module inputs data on a source text; a translation module for translating the input source text with reference to the database; and an output module outputs data on a translation of the source text. The translation module reduces the number of successive identical characters contained in an emphasized word to generate a modified word and obtains a target-language word equivalent to the modified word from the database.

Emphatic attribute data used as an attribute for identifying the target-language word and an emphasized target-language word associated with the emphatic attribute data are associated with and registered with the modified word in the database, and if the emphatic attribute data is associated with the modified word and is found in the database, the output module can output the data on the translation in which the emphasized target-language word associated with the emphatic attribute data is used as the target-language word.

The output module can output data indicating that the target-language word in the data on the translation is translated based on the modified word, together with the data on translation. A display may be provided for displaying the translation in which the target-language word is emphasized based on the translation data provided from the output module.

BRIEF DESCRIPTION OF THE DRAWINGS

There are shown in the drawings embodiments which are presently preferred, it being understood, however, that the invention is not limited to the precise arrangements and instrumentalities shown.

FIG. 3 shows an example of data stored in a dictionary data storage;

FIG. 4 shows a specific example of translation, in which (a) indicates a source text and (b) indicates a target sentence presented after the translation;

DETAILED DESCRIPTION OF THE INVENTION

The present invention will be described below in detail with respect to an embodiment shown in the accompanying drawings.

Figure 1:
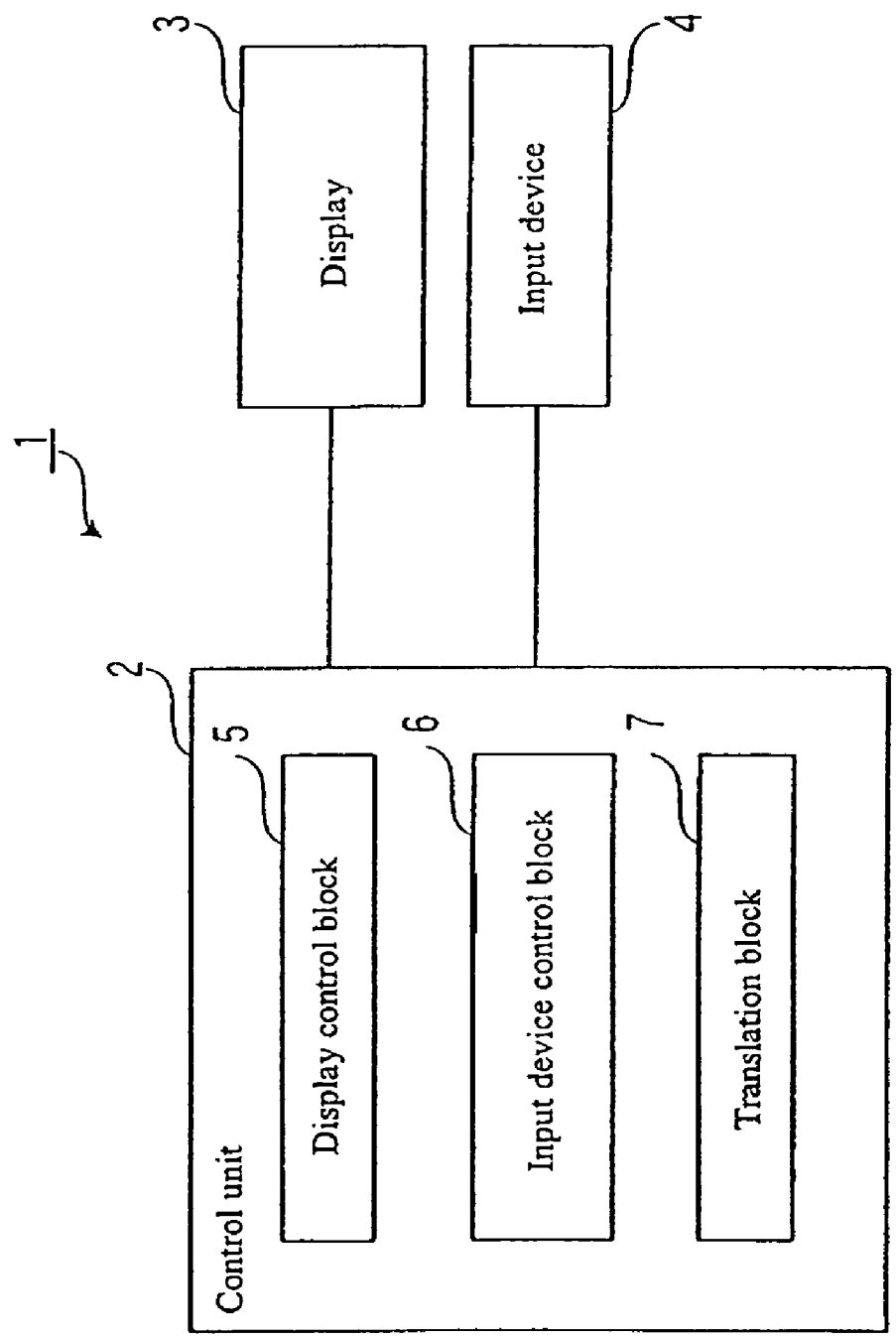
FIG. 1 shows a general configuration of a computer according to the present invention.

FIG. 1 schematically illustrates a configuration of a computer in the embodiment.

As shown in FIG. 1, the computer 1 comprises a control unit 2 including a CPU, main memory, and HDD, and a display (display unit) 3 with a CRT or LCD panel, and an input device 4 such as a keyboard for entering text and other information to be displayed on the display panel of the display 3 and a mouse for manipulating a pointer.

The control unit 2 has functions including a display control block 5 for providing display on the screen of the display 3 according to a draw command from the CPU, an input device control block 6 for controlling data input by a user, and a translation block 7 for performing translation.

The display control block 5 is implemented by a video driver, video chip, and other components, which are not shown, and cause the display 3 to provide display based on image data transmitted from the main memory and other sources.

The input device control block 6 is implemented by a user interface driver for processing events caused by the user manipulating the input device 4 such as a pointing device and keyboard. In particular, the input device controller 6 performs processing for causing the display 3 to display data input through manipulation of the input device 4 by the user.

The translation block 7 is implemented by the CPU performing processes according to a program stored in the HDD in cooperation with the main memory. The translation block 7 will be described in detail below.

Figure 2:
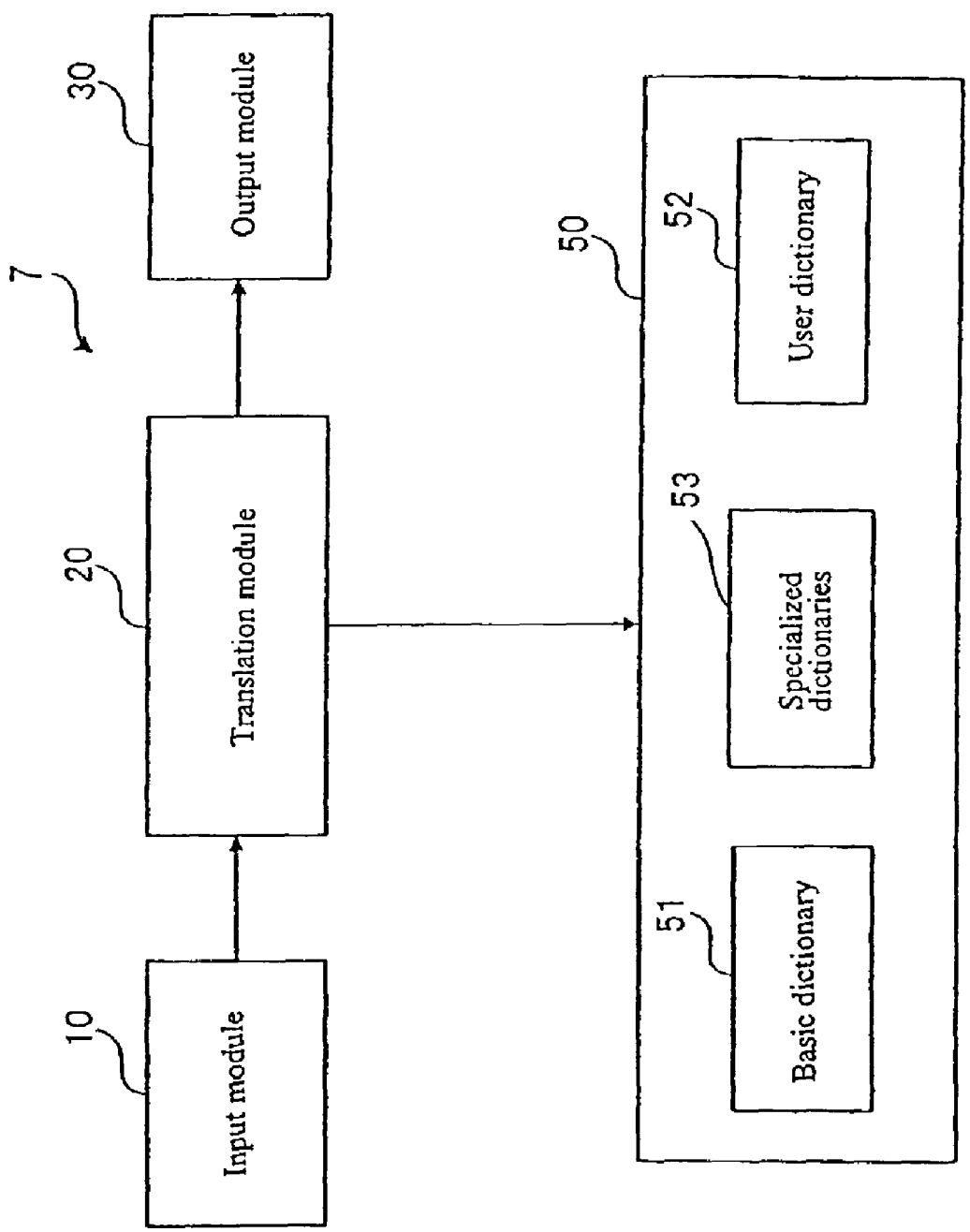
FIG. 2 shows a configuration of a translation block.

FIG. 2 shows a functional configuration of the translation block 7.

The translation block 7 has an input module 10 for obtaining source text to be translated, a translation module 20 for translating the obtained source text, an output module 30 for outputting data to cause the display 3 to display a target text resulting from the performed translation, and a dictionary data storage 50 for storing dictionary data to be used in translation. The dictionary data storage 50 contains a basic dictionary 51 and a user dictionary 52 and, in addition, specialized dictionaries 53 such as sport, computer, art, entertainment, politics and economics, science, and household dictionaries.

FIG. 3 shows an example of data stored in the dictionary data storage 50. The dictionary data storage 50 contains data as shown in FIG. 3, for example for the Japanese language. Contained in the dictionary data storage 50 are the parts of speech, semantic attributes, and emphatic attributes, Japanese equivalents for each source word, and the attributes of the Japanese equivalent. The part of speech of the word "cool" provided by way of example is identified as an adjective and two Japanese equivalents, "冷静 (reisei)" and "クーール (kuuuru)" are registered for the word. A word "Japanese" is identified as a noun and also as an adjective. Japanese equivalents "日本人 (nihon-jin)" and "日本語 (nihon-go)" for the noun and a Japanese equivalent "日本 (nihon)" for the adjective are registered. If a word of the same part of speech has a plurality of equivalents, like "冷静 (reisei)" and "クーール (kuuuru)" for "cool", and "日本人 (nihon-jin)" and "日本語 (nihon-go)" for "Japanese", which equivalent word should be used is determined based on the semantic attribute and emphatic attribute of the source word, and the attribute of Japanese equivalents in consideration of relationships among the words making up the source text. The emphatic attribute indicates the presence or absence of an equivalent for an emphasized source word. If the emphatic attribute of a word is "YES," then it means that the word is an emphasized expression.

When performing a translation, the translation block 7 having the above-described configuration refers to the dictionary data storage 50 based on source text (a sentence or words) obtained through the input module 10. The translation module 20 performs a translation to generate a translated text, which is output through the output module 30. During the translation, the dictionary data storage 50 containing grammatical rules and word data is consulted to perform processes, including morphological analysis, syntactic analysis, syntax generation, and target-language word generation, are performed in sequence in the translation module 20. Even if an emphasized word is contained in source text, the translation module 20 can provide through these translation processes a correct translation in which a target-language word equivalent to that emphasized word is emphasized. For example, an emphasized word "coool," which is "cool" plus an extra "o", in source text in English shown in FIG. 4a is translated into an emphasized word "*クーール* (kuuuru)" in the translation in Japanese, as shown in FIG. 4b.

A process performed in the translation block 7 for correctly translating an emphasized word in an emphasized manner will be specifically described below with respect to an example in which the source sentence shown in FIG. 4a is translated into the Japanese sentence shown in FIG. 4b. The translation process is generally the same as a conventional one. Therefore, the detailed description of well-known part of the translation processing will be omitted. The translation algorithm used and the output form of the resulting translation provided below are not limitative.

Figure 5:
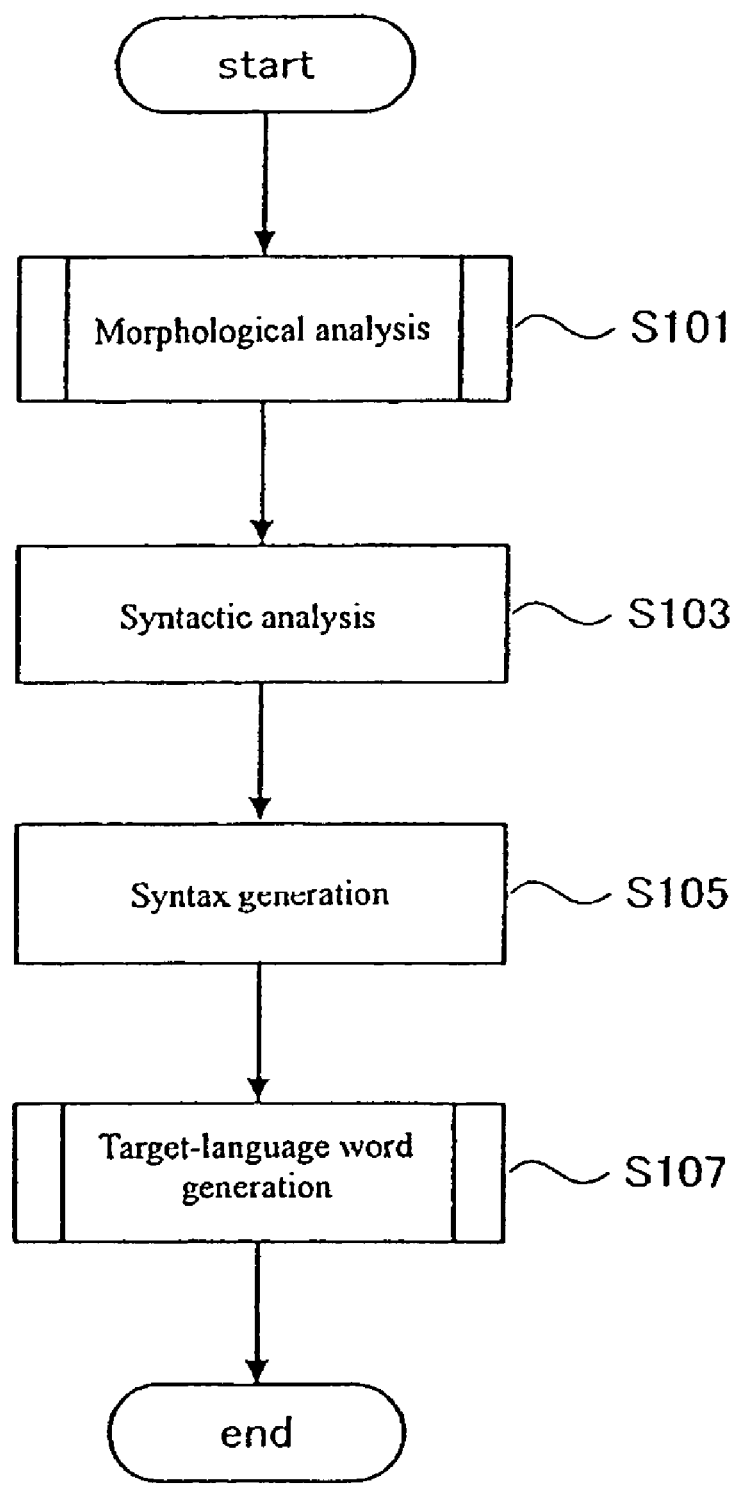
FIG. 5 shows a flow of a translation process performed in the translation block.

FIG. 5 shows a general flow of a translation process performed in the translation block 7.

First, the translation block 7 performs morphological analysis on source text obtained through the input module 10 (step S101). In the morphological analysis, the source text sentence is separated into words and their parts of speech and attributes are determined with reference to data stored in the dictionary data storage 50.

Figure 6:
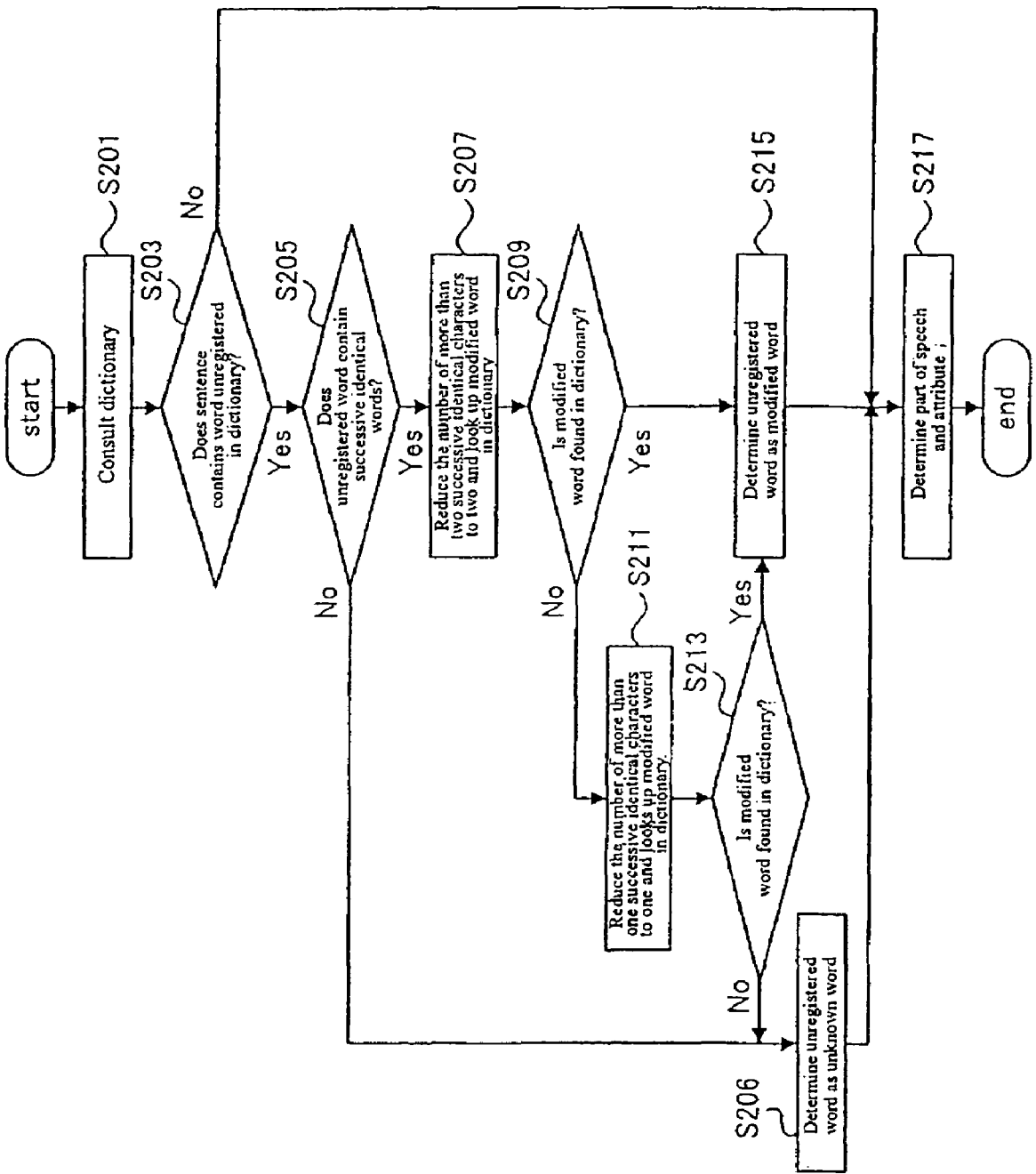
FIG. 6 shows a detailed process flow of morphological analysis shown in FIG. 5.

FIG. 6 specifically shows a flow of the morphological analysis at step S101.

As shown in FIG. 6, the translation module 20 first looks up each of the separated words in the source sentence in the dictionary data storage 50 (step S201). Data contained in the dictionary data storage 50 includes parts of speech, semantic attributes, emphatic attributes, Japanese equivalents for source words, and the attributes of the Japanese equivalents, as shown in FIG. 3. In this dictionary lookup, each word in the dictionary data storage 50 that matches each of the words is extracted. In the present example, separated words "It," "is," "very," and "coool" in the source sentence shown in FIG. 4a are looked up in the dictionary data storage 50 and matching words are extracted.

Then, the translation module 20 determines based on the results of the dictionary lookup at step 201 whether the sentence contains a word that is not contained in the dictionary data storage 50 (hereinafter called an unregistered word) (step S203). If it determined that the sentence contains no unregistered word, that is, all the words making up the source sentence is contained in the dictionary data storage 50, then it would proceed to step S217, where it would determine the parts of speech and attributes of the words, which will be detailed later.

The source sentence shown in FIG. 4a contains an unregistered word "coool" that is not contained in the dictionary data storage 50. Therefore, the translation module 20 determines at step S203 that the source sentence contains the unregistered word and determines whether the unregistered word contains two or more successive identical characters (hereinafter called successive characters) (step S205). If the translation module 20 determines at step S205 that the unregistered word contains no successive identical characters, then it determines that the unregistered word should be treated as an unknown word (step S206).

Figure 4:
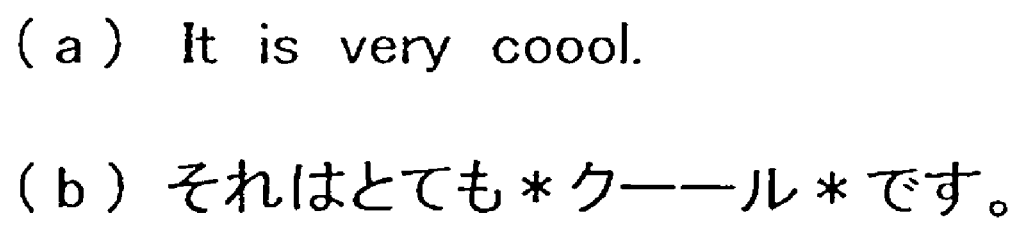

On the other hand, if the translation module 20 determines at step S205 that the unregistered word contains successive identical characters, like "ooo" in "coool," then it modifies the word by replacing the three successive characters with two identical characters to generate a word (hereinafter called a modified word) and looks up the modified word in the dictionary data storage 50 (step S207). That is, it modifies the word "coool" into "cool" and consults the dictionary for "cool." The translation module 20 then determines based on the result of the dictionary consultation whether the modified word is registered in the dictionary data storage 50 (step S209). In the example shown in FIG. 4a, the word modified at step S207 matches the word "cool" stored in the dictionary data storage 50 as shown in FIG. 4. Accordingly, the translation module 20 determines that the modified word is registered in the dictionary data storage 50.

On the other hand, if the translation module 20 determined at step S209 that the modified word resulting from the modification of three successive identical characters into two identical characters is not registered in the dictionary data storage 50, or if no modified word is created because the unregistered word does not contain more than two successive identical characters (for example if it contained two successive identical characters), the translation module 20 replaces the two or more characters in the unregistered word with one to generate a new modified word and looks up the modified word in the dictionary data storage (step S211). Then, the translation module 20 determines based on the result of the dictionary consultation whether the new modified word is registered in the dictionary data storage 50 (step S213).

Words that contain a plurality of sets of successive identical characters, such as "pleeeaaase" for example, may be encountered in a process for generating a modified word and making reference to a dictionary as in steps S207 and S211. In such a case, it is required that the number of the successive characters in each set (the sequence of e's and the sequence of a's in this example) be reduced to one or two, the resulting sets be combined into a modified word, and then the modified word be looked up in the dictionary. Such a process, which is not shown, will be readily extended by those skilled in the art from the process described with respect to the present embodiment.

If the translation module 20 determines at step S209 that the modified word resulting from the reduction of three or more successive characters in the unregistered word to two identical successive characters is registered in the dictionary data storage 50, or if it determines at step S213 that the modified word resulting from the reduction of two or more successive identical characters in the unregistered word into one character is registered in the dictionary storage 50, then the translation module 20 determines that the unregistered word should be treated as the modified word (step S215). At this point, a flag (data) is assigned to the modified word for indicating that the word is generated by modifying an unregistered word.

In this way, if the source sentence contains an unregistered word, the translation module 20 determines the word as a modified word at step S215 or as an unknown word at step S206. Then, the translation module 20 determines the part of speech and the attribute of each of the words making up the source sentence (at step S217), thereby ending the operation at step S101. In some cases, the morphological analysis at step S101 cannot uniquely identify the part of speech or attribute of a word. In such a case, a plurality of parts of speech or attributes can be kept as candidates.

After the completion of step S101 in FIG. 5, the translation block 7 performs syntactic analysis (step S103). In the syntactic analysis, the source sentence separated into words is analyzed with reference to grammatical rules stored in the basic dictionary 51 in the dictionary data storage 50 to generate tree data called syntactic tree data. Syntactic tree data is tree data representing which part of a source sentence is the subject and which is the predicate or, that the predicate is a verb phrase consisting of a verb and an object and the object is a noun phrase consisting of an article and a noun, for example. Semantic attributes, in addition to grammatical attributes, may be specified in the grammatical rules used for the syntactic analysis.

Then, the translation block 7 performs syntax generation based on the result of the operation at step S103 (step S105). In the syntax generation, syntactic tree data for the target language (Japanese in English-to-Japanese translation) is generated with reference to the syntactic tree data for the source language (English in English-to-Japanese translation) that is obtained by the syntactic analysis at step S103.

The translation block 7 then generates equivalent target-language words based on the syntactic tree data obtained at step S105 (step S107). If a word for which an equivalent target-language word for a source word is not determined in the syntactic tree data (if a word has a plurality of equivalent target-language words of the same part of speech or otherwise has more than one candidate for its equivalent), a target-language equivalent for the word is identified with reference to the dictionary data storage 50 in this target equivalent generation. Then, the equivalents target-language words finally obtained are linked together into one sentence.

Figure 7:
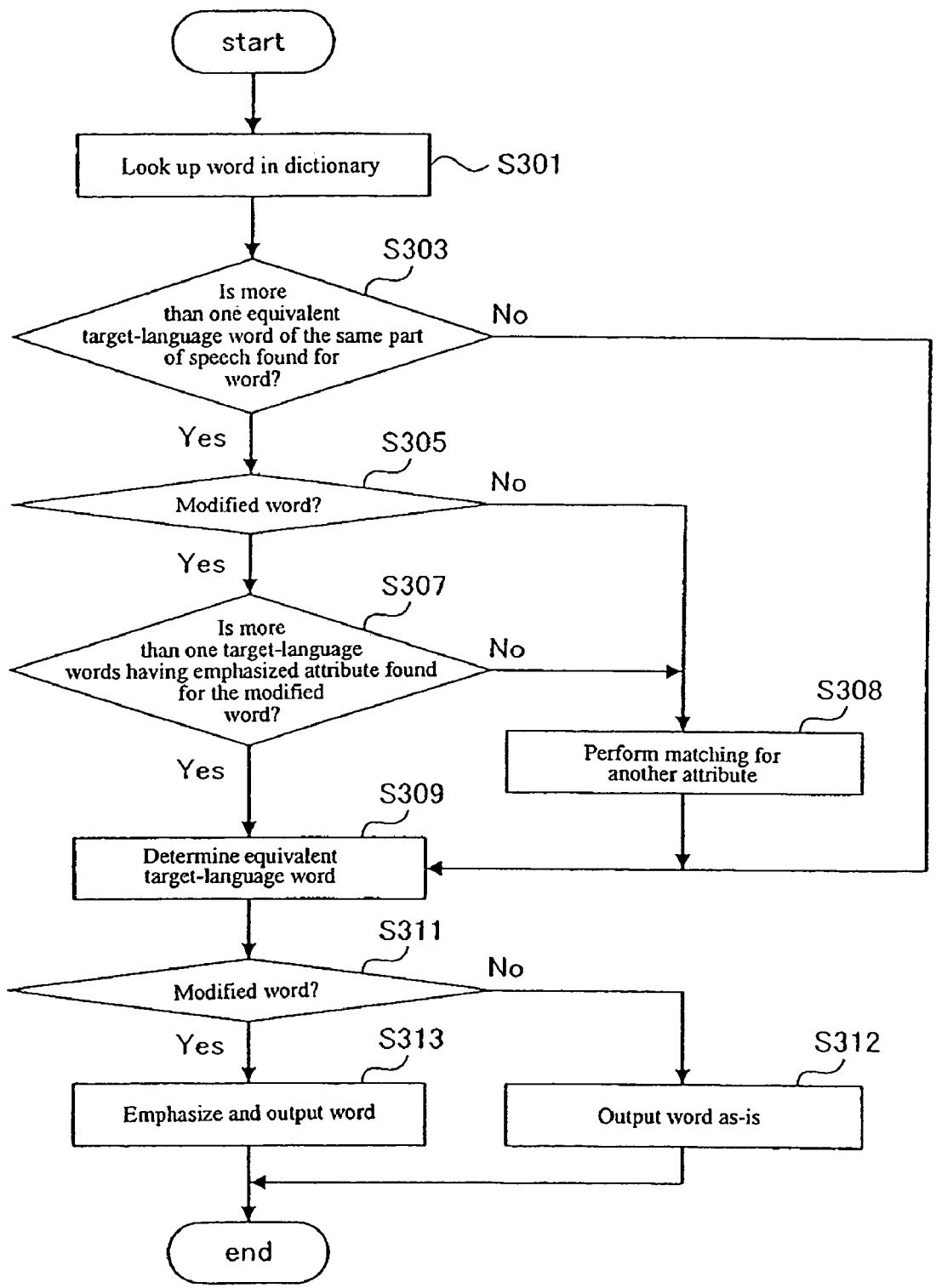
FIG. 7 shows a detailed process flow of equivalent target-language word generation shown in FIG. 5.

FIG. 7 shows a detailed flow of the operation at step S107 for generating equivalent target-language words.

As shown in FIG. 7, the translation module 20 looks up each of the separated words making up the source sentence in the dictionary with reference to data in the dictionary data storage 50 (step S301). This dictionary consultation is performed after the parts of speech of the words to be looked up in the dictionary are identified base on the syntactic tree data obtained at step S105 shown in FIG. 1, for the purpose of determining the final equivalent target-language words.

Then the translation module 20 determines whether a word looked up in the dictionary has more than one equivalent target-language word of the same part of speech (step S303). The dictionary data storage 50, in which equivalent target-language words for source words are registered on a part-of-speech basis, may contain more than one equivalent target-language word for a word of the same part of speech. For example, equivalent target-language nouns "日本人 (nihon-jin: person)" and "日本語 (nihon-go: language)" are registered for a source word "Japanese," as shown in FIG. 3. If the translation module 20 determines at step S303 that only one equivalent target-language word is registered for the source word, it proceeds to step S309, which will be described later.

On the other hand, if the translation module 20 determines at step S303 that more than equivalent target-language word for a word is registered, then it determines at step S305 whether the word is a modified word generated at step S101 (step S207 or S211). It performs the determination whether or not the word is a modified word according to whether or not the word has a flag assigned to it at step S215 that indicates that the word is a modified unregistered word. If the translation module 20 determines at step 305 that the word is a modified word, then it determines whether an equivalent target-language word having an emphatic attribute for the modified word is registered (step S307). For example, "coool" shown in FIG. 4a has been modified into "cool" at step S101. For "cool," an equivalent target-language word クーール (kuuru)" for which the emphatic attribute=YES is set is registered as shown in FIG. 3. Like this, if it is determined that a source word has an equivalent target-language word having the emphatic attribute, it is determined that the equivalent target-language word should be used in the target sentence (step S309).

On the other hand, if the translation module 20 determines at step S305 that the word is not a modified word, or if it determines at step S307 that no equivalent target-language words are registered for the modified word, it performs matching for the word for another semantic attribute, such as a semantic attribute, required in the syntactic tree data (step S308). It then extracts the equivalent target-language word having an attribute that best matches the attribute and determines it to be used in the target sentence (step S309). If the attribute that best matches cannot be determined, a first equivalent target-language word (an equivalent target-language word most frequently used) may be selected.

Then, the translation module 20 determines whether or not the word for which the equivalent target-language word is determined is a modified word (step S311). If the translation module 20 determines that the word is not a modified word, then it provides the equivalent target-language word to the output module 30 as-is (step S312) and then ends this process.

On the other hand, if the translation module 20 determines that the word for which the equivalent target-language word is determined is a modified word, it emphasizes the equivalent target-language word and outputs the emphasized word through the output module 30 (step S313), then it ends this process. In this emphasizing step, a symbol such as an asterisk (*) is prepended and appended to the target-language word for indicating that its source word is emphasized in the source sentence.

In this way, target-language words are determined for the individual target-language words through the process shown in FIG. 7 and they are linked together into a final target sentence to output it through the output module 30. The output target sentence is displayed on the display 3 through processing performed in the translation block 7 and display control block 5 in the computer 1. For example, the source sentence shown in FIG. 4a is displayed on the display 3 as a target sentence shown in FIG. 4b. In the example shown in FIGS. 4a and 4b, the emphasized word "coool" is translated into a target-language word クーール having the emphatic attribute and symbols "*" surround the word, resulting in a representation クーール

In this way, in translating colloquial text in the computer 1 according to the present embodiment, the number of successive identical characters contained in an emphasized word is reduced to produce a word that matches a word registered in the dictionary data storage 50. Thus, the part of speech of the emphasized word can be correctly recognized in the computer 1. Consequently, occurrence of erroneous translations can be inhibited and, in addition, source text that was untranslatable according to the prior art can be translated according to the present embodiment.

When an emphasized word is translated, an equivalent target-language word that corresponds to the emphasized word is used and symbols are prepended and appended to the equivalent word to indicate that it is translated from an emphasized word in the source text. Consequently, a user can understand the intention of the source sentence more precisely.

Furthermore, it is likely that the feel of the source sentence containing an emphasized word will be properly preserved in the translation by selecting a typical equivalent target-language word for the emphasized source word.

Figure 8:
FIGS. 8A, 8B, and 8C show examples of alternative presentations of emphasized words in target sentences.

The technique for emphasizing a word to be output by translation of an emphasized source word is not limited to addition of symbols to the word as shown in FIG. 4b. FIGS. 8A, 8B, and 8C show examples of expression of emphasized words in target language.

The source sentence (a) shown in FIG. 8A contains "Oooooooops," which is "Oops" emphasized by successive o's. Its equivalent in the translation (b) is "しまったぁ～" and symbols "* * *" are prepended and appended to it to highlight it. Like this, symbols used as emphasizing data are not limited. They may take any form. Furthermore, they may be placed in any positions. They may be inserted in the emphasized word, as "し*ま*っ*た*ぁ～".

If, as in HTML format, font data or colors can be set when a target text is presented on the display 3, an emphasized word can be indicated by using a different typeface, style, or size or a different color.

An example is shown in FIG. 8B, in which a source text (a) contains "soooooo," which is "so" emphasized with successive o's. This emphasized word is translated into "とても (totemo)", which is non-emphasized word (the emphatic attribute of which is not set to YES), because it has no target-language words for which the emphatic attribute is set to YES. Therefore, the word とても is shaded in order to indicate that it is emphasized.

Another example is shown in FIG. 8C, in which a source text (a) contains a word "Pleeeaaase" representing "Please" emphasized with successive e's and a's. Its equivalent target-language word in a target text is "おねが～い (onegaai)", which is an emphasized word. This word is further emphasized by using a larger point size to give it prominence.

Methods for emphasizing a target-language word are not limited to specific ones. Methods for changing fonts such as styles and sizes, and colors may be used for emphasizing a word. It may also be possible that no such emphasizing methods are used if a target-language word having an emphatic attribute is used or if simple text presentation is preferable.

While the translation process in the present embodiment is applied to translation from source text in English to target text in Japanese, the present invention is not limited to this. The present invention can be applied to translation from any source language to any target language, such as from English to German, for example.

Also, the translation process according to the present embodiment can be performed on portable computers such as PDAs and cellphones, besides laptop and desktop PCs. It can be performed on Web pages or chart sites on the Internet as well.

While the dictionary data storage 50 used in the translation process in the present invention is provided within the computer 1, the dictionary data referred to by the computer 1 during translation may be provided external to the computer 1. For example, the dictionary data may be obtained by the computer 1 over a network.

A program for causing a computer to perform the processes describe above may be embodied by a storage medium.

The storage medium may be one, such as a CD-ROM, DVD, memory, or hard disk, on which the program for causing a computer to perform the processes described above is stored in a computer-readable form.

Various other modifications and substitutions may be made to the configuration described above with respect to the present embodiment without departing from the spirit and scope of the present invention.

The invention claimed is:

1. A translation method for translating a source text in a given source language input into a computer into a text in a target language, comprising the steps of:
   using morphological analysis, extracting from a database, referenceable to said computer, parts of speech and attributes of words making up the source text input into said computer;
   generating, using syntactic analysis, syntactic tree data having a tree structure for the source text based on the result of said morphological analysis:
   generating, using a syntax generation process, syntactic tree data for a target sentence based on the result of said syntactic analysis;
   obtaining, using a translation generation process, target-language words equivalent to said words making up said source text from said database and linking said target-language words together based on said syntactic tree data for the target sentence to generate a translation;

if said source text contains an unregistered word that is not registered in said database and said unregistered word contains two or more successive identical characters including identical consonants or vowels, reducing the number of said successive identical characters to one or two to generate a modified word and if the modified word is found in the database, extracting the part of speech and the attribute of said modified word from said database in place of said unregistered word and replacing said unregistered word with the modified word said morphological analysis; and if said modified word replacing said unregistered word has an emphatic attribute, obtaining an emphasized target-language word associated with said emphatic attribute as said target-language word from said database in said translation generation process; and displaying the translation to a user.

* * * * *